(12) United States Patent
Lawless

(10) Patent No.: US 6,877,325 B1
(45) Date of Patent: Apr. 12, 2005

(54) ELECTROCALORIC DEVICE AND THERMAL TRANSFER SYSTEMS EMPLOYING THE SAME

(75) Inventor: William N. Lawless, Westerville, OH (US)

(73) Assignee: CeramPhysics, Inc., Westerville, OH (US)

(*) Notice: Subject to any disclaimer, the term of this patent is extended or adjusted under 35 U.S.C. 154(b) by 31 days.

(21) Appl. No.: 10/453,450

(22) Filed: Jun. 3, 2003

Related U.S. Application Data

(60) Provisional application No. 60/392,240, filed on Jun. 27, 2002.

(51) Int. Cl.[7] .............................................. F25B 21/00
(52) U.S. Cl. ............................................................. 62/3.1
(58) Field of Search .......................... 62/3.1, 3.7, 330, 62/467; 252/518.1, 521.1

(56) References Cited

U.S. PATENT DOCUMENTS

| | | | | |
|---|---|---|---|---|
| 3,638,440 A | * | 2/1972 | Lawless ......................... | 62/3.1 |
| 3,998,523 A | * | 12/1976 | Otomo ......................... | 365/121 |
| 4,757,688 A | * | 7/1988 | Basiulis et al. ............... | 62/3.2 |
| 5,644,184 A | * | 7/1997 | Kucherov ..................... | 310/306 |

OTHER PUBLICATIONS

R. Zhang. S. Peng. D. Xiao. Y. Wang. B. Yang. J. Zhu. P. Yu. W. Zhang. Preparation and Charactericaton of (1–x) PB (Mg1/2Nb2/3) O3–x PbTiO3 Electrocaloric Ceramics, 1998,827–832, Department of Materials Science, Sichunn University, Chengdu. P.R. China.

D. M. Berchowitz, D. Kokka. B. D. Mennink. Recent Advances in Surling Cycle Refrigeration. Global Cooling BV. The Netherlans and Sunpower Inc., Athens, Ohio. 8 pgs.

* cited by examiner

*Primary Examiner*—Denise L. Esquivel
*Assistant Examiner*—Malik N. Drake
(74) *Attorney, Agent, or Firm*—Dinsmore & Shohl LLP

(57) ABSTRACT

Thermal transfer devices according to the present invention comprise electrocaloric materials that increase in temperature upon application of an applied voltage thereto and decrease in temperature upon removal of the applied voltage. In specific embodiments of the present invention, the electrocaloric materials, described in further detail below, are configured such that the respective increases and decreases in temperature of the electrocaloric material extend from about –10° C. to about 50° C. As a result, thermal transfer devices according to the present invention are suitable for use in a wide variety of practical refrigeration applications. In accordance with 37 CFR 1.72(b), the purpose of this abstract is to enable the United States Patent and Trademark Office and the public generally to determine quickly from a cursory inspection the nature and gist of the technical disclosure. The abstract will not be used for interpreting the scope of the claims.

28 Claims, 3 Drawing Sheets

ELECTROCALORIC DEVICE AND THERMAL TRANSFER SYSTEMS EMPLOYING THE SAME

CROSS-REFERENCE TO RELATED APPLICATIONS

This application claims the benefit of U.S. Provisional Application Ser. No. 60/392,240, filed Jun. 27, 2002 and entitled SOLID STATE ELECTROCALORIC REFRIGERATION.

BACKGROUND OF THE INVENTION

The present invention relates to electrocaloric devices and, more particularly, to refrigeration and other thermal transfer systems utilizing electrocaloric devices.

BRIEF SUMMARY OF THE INVENTION

Thermal transfer devices according to the present invention comprise electrocaloric materials that increase in temperature upon application of an applied voltage thereto and decrease in temperature upon removal of the applied voltage. In specific embodiments of the present invention, the electrocaloric materials, described in further detail below, are configured such that the respective increases and decreases in temperature of the electrocaloric material extend from about −10° C. to about 50° C. As a result, thermal transfer devices according to many embodiments of the present invention are well suited for use in a wide variety of practical refrigeration applications, including those at or near room temperature.

In accordance with one embodiment of the present invention, a device is provided comprising an electrocaloric device and a power supply configured to apply a voltage to the electrocaloric device. The electrocaloric device comprises the following electrocaloric material $$x(PbMg_{0.33}Nb_{0.67}O_3)+y(PbSc_{0.5}Nb_{0.5}O_3)$$

where x and y represent respective mol percentages of respective portions of the electrocaloric material and the electrocaloric material increases in temperature upon application of an applied voltage thereto and decrease in temperature upon removal of the applied voltage.

In accordance with another embodiment of the present invention the electrocaloric device comprises the following electrocaloric material $$x(PbMg_{0.33}Nb_{0.67}O_3)+y(PbTiO_3)+z(SrTiO_3)$$

where x, y, and z are each greater than zero and represent respective mol percentages of respective portions of the electrocaloric material.

In accordance with yet another embodiment of the present invention, the electrocaloric device comprises the following electrocaloric material $$x(PbMg_{0.33}Nb_{0.67}O_3)+y(PbTiO_3)+z(SrTiO_3)$$

where x, y, and z are each greater than zero and represent respective mol percentages of respective portions of the electrocaloric material and C represents a ceramic oxide configured to offset substantially an increase in a dielectric transition temperature attributable to inclusion of $PbTiO_3$ in the electrocaloric material.

In accordance with yet another embodiment of the present invention, the electrocaloric device comprises the following electrocaloric material $$x(A)+y(B)+z(C)$$

where A represents a ceramic oxide of Pb, Mg, and Nb, B represents a ceramic oxide of Pb and at least one additional metal selected from Sc, Nb, and Ti, C represents a ceramic oxide of Sr and Ti, x represents a mol percentage of between about 45 and about 90, y represents a mol percentage of between about 10 and about 55, and z represents a mol percentage of about 0 where B represents a ceramic oxide of Pb, Sc and Nb, and a mol percentage greater than 0 and less than about 10 where B represents a ceramic oxide of Pb and Ti.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
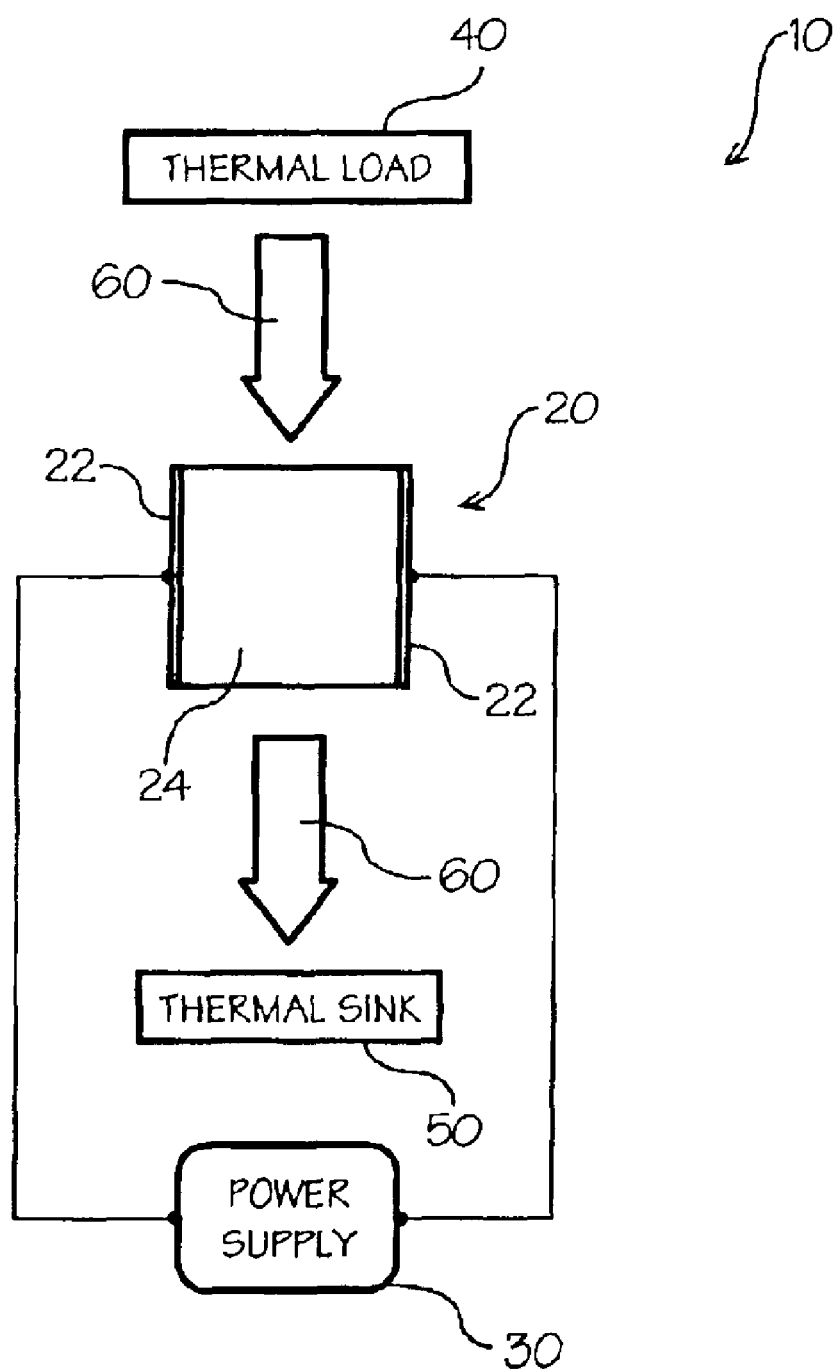
FIG. 1 is a schematic illustration of a thermal transfer system employing an electrocaloric device according to the present invention.

Referring initially to FIG. 1, a thermal transfer device 10 according to the present invention is illustrated. The device 10 comprises an electrocaloric device 20 and a power supply 30 configured to apply a voltage to the electrocaloric device 20. Specifically, the electrocaloric device 20 comprises a single or multilayer capacitor including electrodes 22 and an electrocaloric material 24 as the capacitor dielectric. The electrocaloric material 24 increases in temperature upon application of an applied voltage thereto and decrease in temperature upon removal of the applied voltage. In specific embodiments of the present invention, the electrocaloric material 24, described in further detail below, is configured such that the respective increases and decreases in temperature of the electrocaloric material extend from about −10° C. to about 50° C. As a result, thermal transfer devices 10 according to the present invention are suitable for use in, among other things, refrigeration applications well below 0° C.

The electrocaloric device 20 is configured to enable transfer of heat from a thermal load 40, e.g., an enclosed storage compartment of a refrigerator, to a thermal sink 50. More specifically, one or more heat exchangers 60, which may comprise solid components, a fluid, or a combination of the two, may be provided to thermally couple the thermal load 40 and the thermal sink 50 to the electrocaloric device 20. The specific design of the heat exchanger 60 is beyond the scope of the present invention and will vary depending on the nature of the thermal transfer device 10 employing the electrocaloric device 20 of the present invention. It is contemplated that respective heat exchangers 60 may comprise thermal switches or any other device or configuration to affect selective or non-selective transfer of heat from the load 40. It is also contemplated that respective heat exchangers 60 may be coupled thermally between the electrocaloric device 20 and the thermal load 40 and between the electrocaloric device 20 and the thermal sink 50, as is illustrated schematically in FIG. 1. Alternatively, the heat exchanger 60 may be defined by the body of the electrocaloric device 20 and, as such, may be coupled thermally between the thermal load 40 and the thermal sink 40.

Regarding the specific nature of thermal transfer device 10 employing the electrocaloric device 20 of the present invention, it is contemplated that the heat exchangers 60, the thermal load 40, and the thermal sink 50, may assume any suitable form for rendering any one of a variety of thermal transfer devices including, but not limited to, split cycle refrigeration systems, cascading regenerator refrigeration systems, solid state refrigeration systems, etc. In the context of a Stirling cycle refrigeration system, which may be of the split cycle, cascading, or other type, the electrocaloric device 20 of the present invention is well suited to function as part of a regenerator for a Stirling cycle type refrigeration system.

The electrocaloric material 24 of the present invention may be characterized as follows:

$$x(A)+y(B)+z(C)$$

where

A represents a ceramic oxide of Pb, Mg, and Nb,

B represents a ceramic oxide of Pb and at least one additional metal selected from Sc, Nb, and Ti, and C represents a ceramic oxide of Sr and Ti.

The variables x, y, and z represent respective mol percentages of respective portions of the electrocaloric material. The variable z represents a mol percentage of about 0 where B represents a ceramic oxide of Pb, Sc and Nb, and a mol percentage greater than 0 where B represents a ceramic oxide of Pb and Ti.

More specifically, the electrocaloric material may comprise $$x(PbMg_{0.33}Nb_{0.67}O_3)+y(PbSc_{0.5}Nb_{0.5}O_3)$$

where x represents a mol percentage of between about 45 and about 70 and y represents a mol percentage of between about 30 and about 55. In a specific embodiment of the present invention, x represents a mol percentage of about 55 and y represents a mol percentage of about 45.

Alternatively, the electrocaloric material may comprise $$x(PbMg_{0.33}Nb_{0.67}O_3)+y(PbTiO_3)+z(SrTiO_3)$$

where x represents a mol percentage of between about 80 and about 90, y represents a mol percentage of between about between about 10 and about 20, and z represents a mol percentage greater than 0 and less than about 10. It is noted that the ceramic oxide $SrTiO_3$ offsets, at least partially, the increase in dielectric transition temperature attributable to inclusion of $PbTiO_3$ in the electrocaloric material. As such, it is contemplated that other suitable ceramic oxides that also offset the increase in dielectric transition temperature may be utilized in accordance with the present invention.

Figure 2:
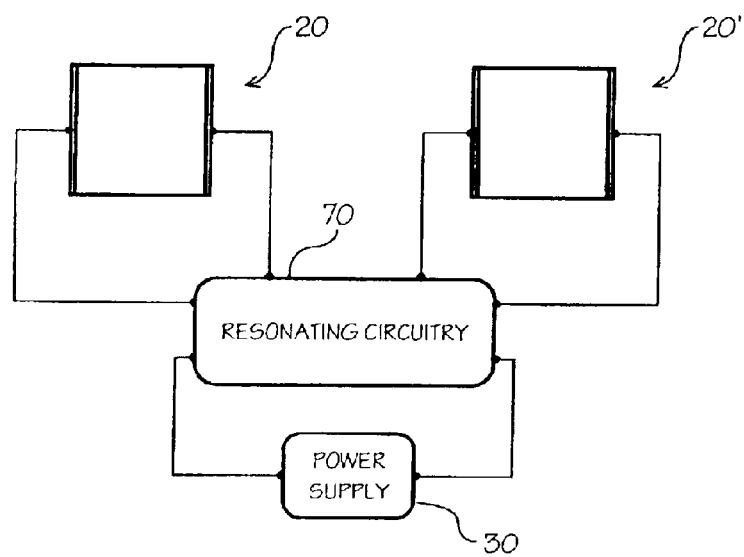
FIG. 2 is a schematic illustration of a resonating thermal transfer system according to the present invention.

Referring now to FIG. 2, the thermal transfer device 10 according to the present invention may comprise resonating circuitry 70 coupling a pair of electrocaloric devices 20, 20' such that electrical discharge of one of the electrocaloric devices 20 contributes to charging of the other of the pair of electrocaloric devices. Further, the resonating circuitry 70 may be configured to resonantly couple the pair of electrocaloric devices to establish a continuous cycle where discharge of one of the electrocaloric devices partially charges the other of the electrocaloric devices.

Figure 3:
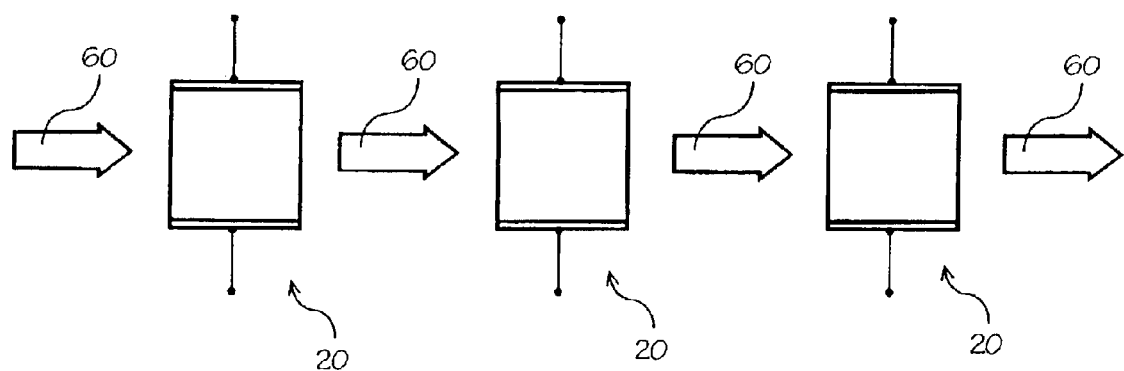
FIG. 3 is a schematic illustration of a cascading thermal transfer system according to the present invention.

It is noted that thermal transfer devices 10 may comprises a plurality of electrocaloric devices 20 and, as is illustrated in FIG. 3, the plurality of electrocaloric devices 20 may be configured to define a cascading thermal coupling where heat is transferred through a cascaded series of electrocaloric devices 20. Electrocaloric devices 20 according to the present invention may embody more than one capacitor structure and may be configured in one or more capacitor banks.

Figure 4:
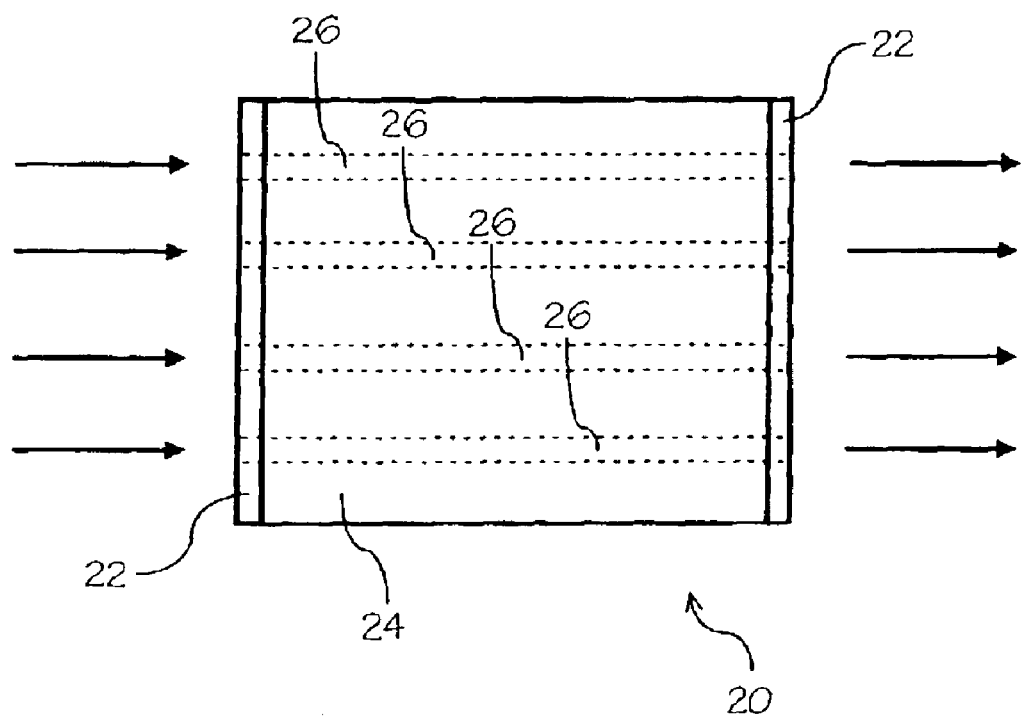
FIG. 4 is a schematic illustration of an electrocaloric device according to the present invention incorporating thermal transfer vias.

Referring finally to FIG. 4, electrocaloric devices 20 according to the present invention may include interior vias 26 defining a thermal flow passages across the electrocaloric device 20. In this manner, the heat transfer capacity of the electrocaloric device 20 may be improved by permitting a heat transfer medium, such as a gas 28, to actually pass through the electrodes 22 and the electrocaloric material 24. For example, where the electrocaloric device 20 comprises a ceramic capacitor and defines a circular cross section, gas vias may be located on one or more concentric circles of the cross section to improve the rate at which the capacitor exchanges thermal energy with the gas. In this context, it is noted that the power supply 30, which is configured to apply the voltage to the electrocaloric device 20, may be configured to apply the voltage according to a predetermined driving cycle that defines a cooling period sufficient to account for the thermal time constant of the electrocaloric device.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A device comprising:

an electrocaloric device; and a power supply configured to apply a voltage to said electrocaloric device, wherein said electrocaloric device comprises the following electrocaloric material $$x(PbMg_{0.33}Nb_{0.67}O_3)+y(PbSc_{0.5}Nb_{0.5}O_3)$$

where x and y represent respective mol percentages of respective portions of said electrocaloric material, and said electrocaloric material increases in temperature upon application of an applied voltage thereto and decrease in temperature upon removal of said applied voltage.

2. A device as claimed in claim 1 where x represents a mol percentage of between about 45 and about 70 and y represents a mol percentage of between about 30 and about 55.

3. A device as claimed in claim 1 where said respective increases and decreases in temperature of said electrocaloric material extend from about −10° C. to about 50° C.

4. A device as claimed in claim 1 wherein said electrocaloric device comprises a ceramic capacitor.

5. A device as claimed in claim 4 wherein said ceramic capacitor defines a circular cross section.

6. A device as claimed in claim 5 wherein said ceramic capacitor comprises gas vias extending across said ceramic capacitor.

7. A device as claimed in claim 6 wherein said gas vias are located on one or more concentric circles of said cross section.

8. A device as claimed in claim 1 wherein said device comprises a plurality of said electrocaloric devices arranged in one or more capacitor banks.

9. A device as claimed in claim 1 wherein said power supply is configured to apply said voltage to said electrocaloric device according to a predetermined driving cycle.

10. A device as claimed in claim 9 wherein said electrocaloric device is characterized by a thermal time constant and said power supply is configured such that said driving cycle defines an cooling period sufficient to account for said thermal time constant.

11. A device as claimed in claim 1 wherein said device further comprises circuitry coupling a pair of said electrocaloric devices such that electrical discharge of one of said electrocaloric devices contributes to charging of the other of said pair of electrocaloric devices.

12. A device as claimed in claim 1 wherein said circuitry is configured to resonantly couple said pair of electrocaloric devices to establish a continuous cycle where discharge of one of said electrocaloric devices partially charges the other of said electrocaloric devices.

13. A device as claimed in claim 1 wherein:
said device comprises a thermal load and a thermal sink; and
said electrocaloric device is configured to enable transfer of heat from said thermal load to said thermal sink.

14. A device as claimed in claim 13 wherein said thermal load comprises an enclosed compartment of a refrigerator.

15. A device as claimed in claim 13 wherein said device further comprises a heat exchanger coupled thermally between said electrocaloric device and said thermal load.

16. A device as claimed in claim 13 wherein said device further comprises a heat exchanger coupled thermally between said electrocaloric device and said thermal sink.

17. A device as claimed in claim 13 wherein said electrocaloric device defines a heat exchanger coupled thermally between said thermal load and said thermal sink.

18. A device as claimed in claim 1 wherein said electrocaloric device includes interior vias defining a thermal flow passages across said electrocaloric device.

19. A device as claimed in claim 1 wherein said device comprises a plurality of electrocaloric devices.

20. A device as claimed in claim 19 wherein said plurality of electrocaloric devices define a cascading thermal coupling.

21. A device as claimed in claim 1 wherein said device further comprises components of a refrigeration system configured to cooperate with said electrocaloric device.

22. A device as claimed in claim 21 wherein said refrigeration system comprises a Stirling cycle refrigeration system.

23. 22 wherein said electrocaloric device is configured to serve as an active regenerator of said Stirling cycle refrigeration system.

24. A device as claimed in claim 21 wherein said refrigeration system comprises a split cycle refrigeration system.

25. A device as claimed in claim 21 wherein said refrigeration system comprises a cascading regenerator refrigeration system.

26. A device comprising:
an electrocaloric device; and
a power supply configured to apply a voltage to said electrocaloric device, wherein
said electrocaloric device comprises the following electrocaloric material $x(PbMg_{0.33}Nb_{0.67}O_3)+y(PbTiO_3)+z(SrTiO_3)$ where x, y, and z are each greater than zero and represent respective mol percentages of respective portions of said electrocaloric material, and
said electrocaloric material increases in temperature upon application of an applied voltage thereto and decrease in temperature upon removal of said applied voltage.

27. A device comprising:
an electrocaloric device; and
a power supply configured to apply a voltage to said electrocaloric device, wherein
said electrocaloric device comprises the following electrocaloric material $x(PbMg_{0.33}Nb_{0.67}O_3)+y(PbTiO_3)+z(C)$ where x, y, and z are each greater than zero and represent respective mol percentages of respective portions of said electrocaloric material and C represents a ceramic oxide configured to offset substantially an increase in a dielectric transition temperature attributable to inclusion of $PbTiO_3$ in said electrocaloric material, and
said electrocaloric material increases in temperature upon application of an applied voltage thereto and decrease in temperature upon removal of said applied voltage.

28. A device comprising:
an electrocaloric device; and
a power supply configured to apply a voltage to said electrocaloric device, wherein said electrocaloric device comprises the following electrocaloric material that increases in temperature upon application of an applied voltage thereto and decrease in temperature upon removal of said applied voltage $x(A)+y(B)+z(C)$ where
A represents a ceramic oxide of Pb, Mg, and Nb,
B represents a ceramic oxide of Pb and at least one additional metal selected from Sc, Nb, and Ti,
C represents a ceramic oxide of Sr and Ti,
x represents a mol percentage of between about 45 and about 90,
y represents a mol percentage of between about 10 and about 55, and
z represents a mol percentage of about 0 where B represents a ceramic oxide of Pb, Sc and Nb, and a mol percentage greater than 0 and less than about 10 where B represents a ceramic oxide of Pb and Ti.

* * * * *

UNITED STATES PATENT AND TRADEMARK OFFICE
CERTIFICATE OF CORRECTION

PATENT NO.    : 6,877,325 B1
DATED         : April 12, 2005
INVENTOR(S)   : William N. Lawless It is certified that error appears in the above-identified patent and that said Letters Patent is hereby corrected as shown below:

Column 5,
Line 59, reads as "23. 22 wherein said electrocaloric device is configured to" should read -- 23. A device as claimed in claim 22 wherein said electrocaloric device is configured to --.

Signed and Sealed this

Eighth Day of November, 2005

JON W. DUDAS
*Director of the United States Patent and Trademark Office*